April 27, 1965  G. J. BROOK  3,180,175
CONTROL LINKAGE
Filed Oct. 22, 1962 4 Sheets-Sheet 1
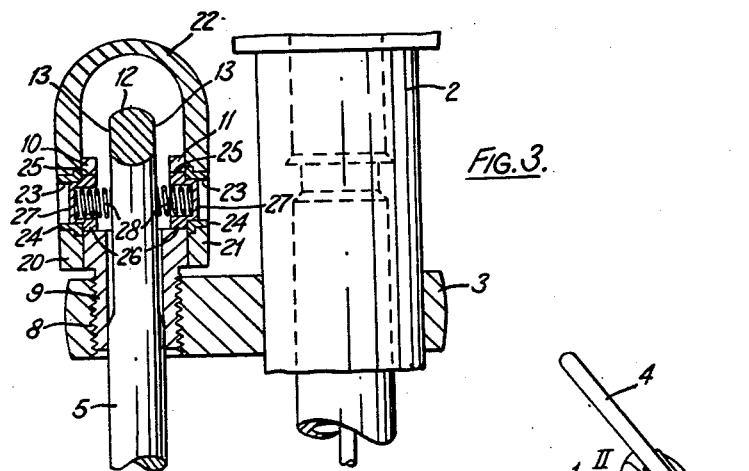
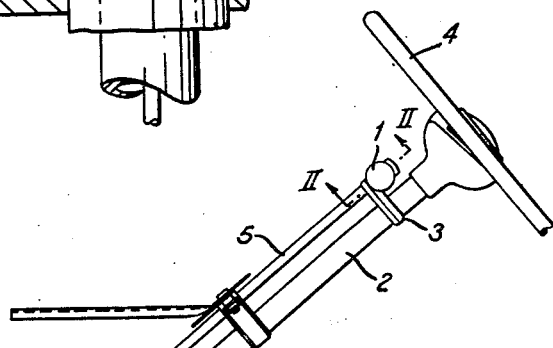
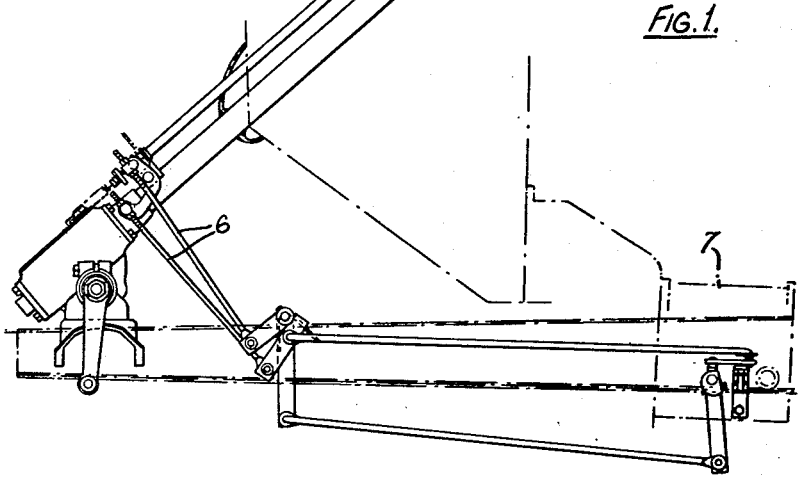
Inventor
Geoffrey John Brook
By A. M. Haiter
Attorney Inventor
Geoffrey John Brook
By A.M. Heiter
Attorney April 27, 1965  G. J. BROOK  3,180,175
CONTROL LINKAGE
Filed Oct. 22, 1962  4 Sheets-Sheet 3

Inventor
Geoffrey John Brook
By A.M. Heiter
Attorney

April 27, 1965

G. J. BROOK 3,180,175

CONTROL LINKAGE

Filed Oct. 22, 1962

Inventor
Geoffrey John Brook
By
Attorney

United States Patent Office 3,180,175
Patented Apr. 27, 1965

3,180,175
CONTROL LINKAGE
Geoffrey John Brook, Dunstable, England, assignor to General Motors Corporation, Detroit, Mich., a corporation of Delaware
Filed Oct. 22, 1962, Ser. No. 232,136
Claims priority, application Great Britain, Oct. 27, 1961, 38,525/61
6 Claims. (Cl. 74—476)

This invention relates to control linkage and more particularly to motor vehicle steering column gear shift mechanisms mounted adjacent the steering wheel.

A known gear shift mechanism, for a three forward speed and reverse gearbox, comprises rotatable selector rod, an arm rigid with and substantially perpendicular to the upper end of the rod, a fitting rotatably mounted in the vehicle about the axis of the rod, and a manual lever pivotally mounted in the fitting for movement about an axis transverse to and intersecting the axis of the rod so that the lever, when rocked about its pivot axis, engages the arm to move the selector rod axially, and, when turned to rotate the fitting, engages the arm to rotate the selector rod. The arm is, in practice, almost invariably a bent-over portion of the selector rod.

With such a mechanism, reverse gear and first gear are obtainable by rocking the lever in one direction and then turning the lever either one way to engage first gear or the other way to engage reverse gear; second and third gear are obtainable by rocking the lever in the opposite direction and then turning the lever either one way to engage second gear or the other way to engage third gear.

There is little risk of reverse gear being inadvertently engaged with such a mechanism since the lever is rocked between only two positions.

The mechanism according to the present invention is a modification of the known mechanism which enables four forward gears and one reverse gear to be engaged with very little risk of reverse gear being inadvertently engaged.

According to the present invention a motor vehicle steering column gear shift mechanism comprises an axially movable and rotatable selector rod, an arm rigid with and substantially perpendicular to the rod, a fitting rotatably mounted in the vehicle about the axis of the rod, a mandrel lever pivotally mounted in the fitting for movement about an axis transverse to and intersecting the axis of the rod such that the lever when rocked about its pivot axis engages the arm to move the selector rod axially and when turned to rotate the fitting engages the arm to rotate the selector rod, and a rod member slidable in the manual lever between one position in which an abutment portion of the rod member axially overlaps the arm of the selector rod and thereby, when the lever is rocked in one direction, is engaged by the arm to prevent further rocking movement in the said direction, and a second position in which the abutment portion of the rod member is axially clear of the arm.

Preferably the manual lever is hollow, and the abutment portion of the rod member is disposed closely adjacent the internal surface of the hollow manual lever such that, in the said one position of the rod member, movement of the manual lever in the said one direction causes the arm of the selector rod to urge the abutment member against the internal surface of the manual lever.

One embodiment of a motor vehicle steering column gear shift mechanism according to the invention will now be particularly described by way of example with reference to the accompanying drawings, in which:

FIGURE 1 is an elevational view showing the shift mechanism in position on a steering column;

FIGURE 3 is a cross-section on the line III—III of FIGURE 2;

Figure 2:
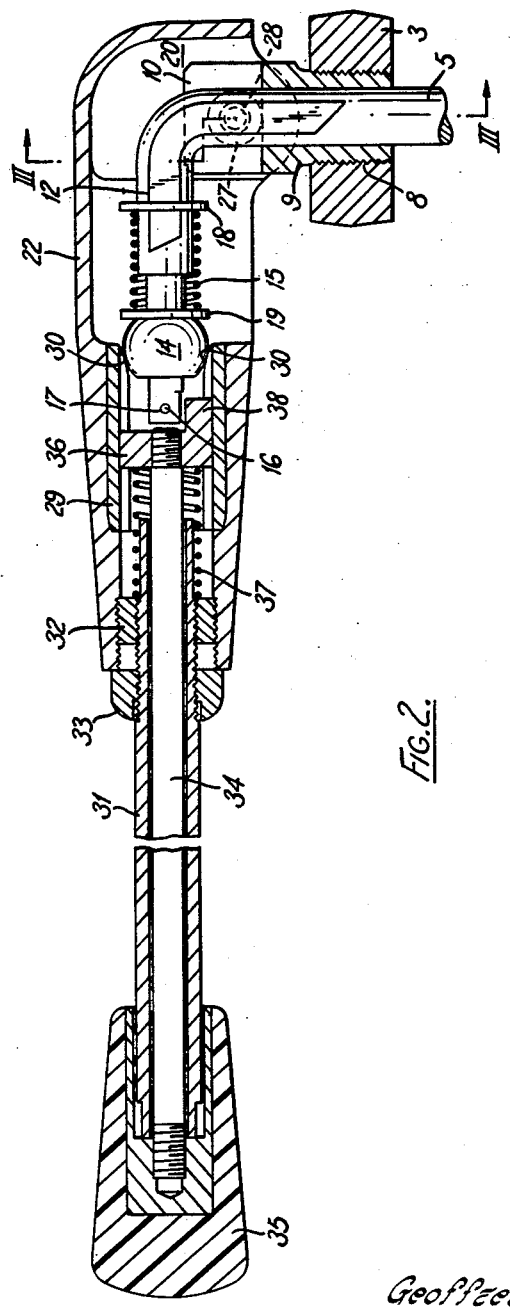
FIGURE 2 is an enlarged section on the line II—II of FIGURE 1, and shows the gear shift mechanism in a first and second gear position.

As shown generally in FIGURE 1, the control mechanism according to this invention includes a gear shift mechanism 1 mounted on a conventional steering column 2 by means of a bracket 3 adjacent the steering wheel 4. Projecting downwards from the gear shift mechanism is an operating rod 5 which is connected, in a conventional manner by way of connecting links 6, to a four forward speed and reverse gear box 7.

The upper end portion of the operating rod 5, the bracket 3, and the rest of the gear shift mechanism are shown in greater detail in FIGURE 2. As shown in this figure, the bracket 3 has an internal thread into which is screwed a lower externally threaded portion 8 of a pivot support fitting 9, the upper portion of the fitting is U-shaped, defining a pair of arms 10 and 11.

The upper end portion of the operating rod 5 is axially slidable and rotatable in a bore in the fitting 9, the lower end of the rod being similarly mounted in the conventional manner as illustrated in FIGURE 1. At its upper end the rod 5 has a bent-over portion forming an arm 12 which is rigid with and substantially perpendicular to the longitudinal axis of the rod. The opposite sides of the rod are machined to form flats 13 which are parallel to the arms 10 and 11 of the fitting 9.

A ball 14 can slide along the arm 12, the ball being urged to the left, as seen in FIGURE 2, by means of a spring 15. A split pin 16 is received within an aperture 17 near the end of the arm 12. Before assembly with a lever member, which will be described below, this pin prevents the ball from sliding off the end of the arm. The spring 15 is seated at its right-hand end on a flange 18 fixed to the arm 12 and has, at its left-hand end, a movable washer 19 which engages the ball.

The arms 10 and 11 of the fitting 9 support a pivotal mounting for arms 20 and 21 (FIGURE 3) which are disposed at the right-hand end of a hollow lever 22. As is shown in more detail in FIGURE 3, the inner surfaces of the arms 20 and 21 of the lever 22 engage the external surfaces of the arms 10 and 11 of the fitting 9. Each arm of the lever 22 has an aperture 23 bounded by a shouldered surface which retains a flanged sleeve 24; each arm of the fitting 9 has an aperture 25 bounded by a shouldered surface which retains a flange 26 of a cup-shaped bearing 27. The cup portion of each bearing 27 enters the corresponding aperture 23 to form the pivotal mounting for the hollow lever 22 on the fitting 9. The interior of each cup-shaped bearing 27 forms a seat for a compression spring 28, the other end of which engages the corresponding one of the pair of flats 13 on the rod 5; the springs 28 urge the cup-shaped bearings 27 outwardly so that the flanges 26 thereof contact the sleeves 24.

As is shown in FIGURE 2, the left-hand portion of the hollow lever 22 has a counterbore which receives a sleeve 29. The right-hand end of this sleeve is chamfered to form wedge-shaped parts 30 against which the ball 14, on the bent-over arm 12, is urged by means of the spring 15. The ball when seated in the end portion of the sleeve provides a pivot, connecting lever 22 to arm 12.

Projecting from the left-hand end of the hollow lever 22 is a control rod assembly including a support sleeve 31. The left-hand end of the hollow lever 22 has an internal thread into which is screwed an internally and externally threaded annular nut 32, and is closed by means of an internally threaded end cover 33. The right-hand end of the support sleeve 31 has an external thread which is screwed into the internal threads of the end cover 33 and the annular nut 32; the support sleeve projects a short distance to the right of the nut 32.

Figure 5:
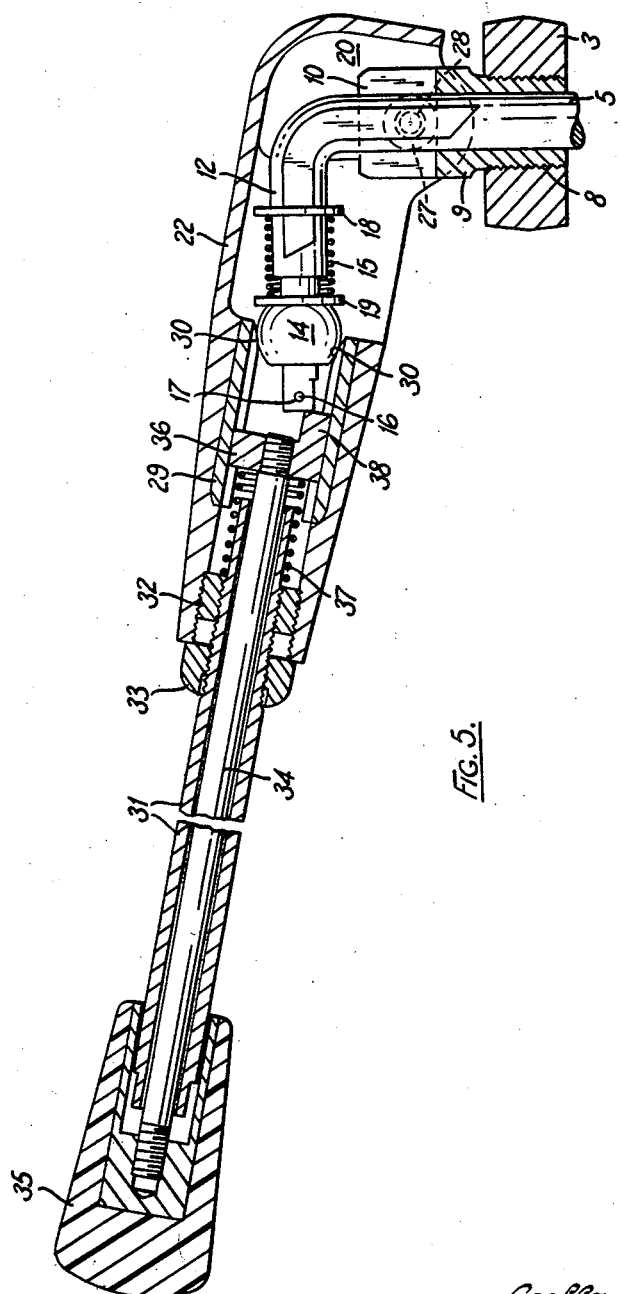
FIGURE 5 is also a view similar to that of FIGURE 2 but in this case with the gear shift mechanism shown in a reverse gear position.

A rod 34 is slidable within the support sleeve 31. The outer (left-hand in FIGURE 2) end of the rod 34 carries a manual knob 35 which slidably surrounds the extreme left-hand end portion of the support sleeve 31. The right-hand end of the rod 34 (FIGURE 2) is threaded and receives an L-shaped abutment member 36. A compressioin spring 37 is located between the annular nut 32 and the abutment member 36 to force the abutment member to the right into a position in which the horizontal, axially extending leg 38 of the L-shaped abutment member 36 axially overlaps the end of the arm 12. When the manual knob 35 is pulled to the left, the axially extending leg 38 is moved clear of the end of the arm 12, whereby the knob 35 may be lifted to move the mechanism into the reverse gear position shown in FIGURE 5.

To engage first or second gear, the lever 22 is first pivoted into the position shown in FIGURE 2, and then turned about the longitudinal axis of the operating rod in a direction appropriate to the desired gear. During this turning movement of the threads of the fitting 9 turn in the internal thread of the bracket 3.

Figure 4:
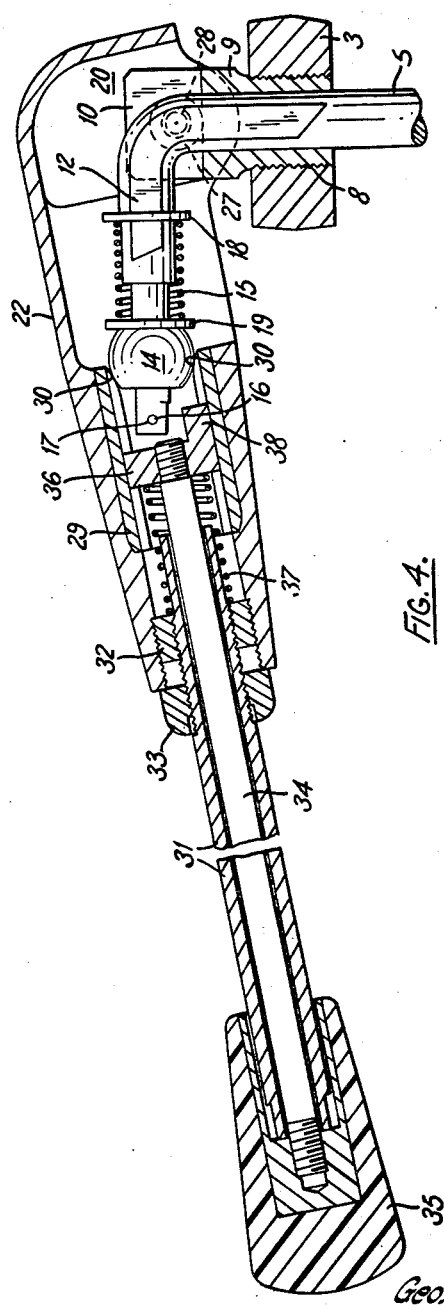
FIGURE 4 is a view similar to that of FIGURE 2 but with the gear shift mechanism shown in a third and fourth gear position.

To engage third or fourth gears, the lever 22 is first pivoted downwardly from the position shown in FIGURE 2 into the position shown in FIGURE 4, and then about the longitudinal axis of the operating rod 5 in a direction appropriate to the desired gear. During the downward pivotal movement of the lever 22, the axially extending leg 38 of the L-shaped abutment member 36 moves radially away from the bent-over arm 12 of the operating rod. For engagement of reverse gear, it is necessary for the lever 22 to be pivoted upwardly beyond the first and second gear position shown in FIGURE 2 into the position shown in FIGURE 5. Such upward pivotal movement would normally be prevented by the axially extending leg 38 of the L-shaped abutment member 36, since when the manual knob 35 is in its normal position the leg 38 axially overlaps the end of the arm 12 to form an abutment between the end portion of the arm 12 and the sleeve 29. To engage reverse gear, therefore, the manual knob 35 is pulled to the left so that the axially extending leg 38 of the L-shaped abutment member 36 moves axially to the left to a position clear of the end portion of the arm 12: the lever 22 can then be pivoted upwardly to the position shown in FIGURE 5, whereupon the lever is turned about the longitudinal axis of the operating rod 5 to complete the engagement of reverse gear.

I claim:
1. In a control linkage, a support, a rod having an axial portion and a laterally extending arm portion, means to support said axial portion of said rod on said support for reciprocal longitudinal movement along an axis and for rotary movement about said axis with respect to said support, lever means, first pivot means pivotally mounting said lever means on said support, second pivot means pivotally connecting said arm portion to said lever means to rotate said axial portion of said rod substantially about said axis on rotary movement of said lever means substantially about said axis and to longitudinally move said axial portion of said rod on axial pivotal movement of said lever means in an axial direction, abutment means on said lever means operative in one position to engage said arm portion at a point spaced from said second pivot means to limit pivotal movement of said lever means and movement of said rod, said abutment means being movable relative to said lever means to another position on said lever means to permit further movement of said lever means and said rod.

2. In a control linkage, a support, a rod having an axial portion and a laterally extending arm portion, means to support said axial portion of said rod on said support for reciprocal longitudinal movement along an axis and for rotary movement about said axis with respect to said support, lever means, a bearing member on said lever means, first pivot means pivotally mounting said lever means on said support, means on said arm portion for contacting said bearing member, said last-mentioned means forming a second pivot means pivotally connecting said arm portion to said lever means to rotate said axial portion of said rod on rotary movement of said lever means substantially about said axis and to longitudinally move said axial portion of said rod on axial pivotal movement of said lever means in an axial direction, abutment means on said lever means operative in one position to engage said arm portion at a point spaced from said second pivot means to limit pivotal movement of said lever means and movement of said rod, said abutment means being movable relative to said lever means to another position to permit further movement of said lever means and said rod.

3. In a control linkage, a support, a rod having an axial portion and a laterally extending arm portion, means to support said axial portion of said rod on said support for reciprocal longitudinal movement along an axis and for rotary movement about said axis with respect to said support, lever means, first pivot means pivotally mounting said lever means on said support substantially on said axis adjacent said arm portion, second pivot means pivotally connecting said arm portion to said lever means to rotate said axial portion of said rod on rotary movement of said lever means substantially about said axis and to longitudinally move said axial portion of said rod on axial pivotal movement of said lever means in an axial direction, abutment means on said lever means operative in one position to engage said arm portion at a point spaced from said second pivot means to limit axial pivotal movement of said lever means and longitudinal movement of said rod, said abutment being movable relative to said lever means to another position on said lever means to permit further movement of said lever means and said rod.

4. In a control linkage, a support, a rod having an axial portion and a laterally extending arm portion, means to support said axial portion of said rod on said support for reciprocal longitudinal movement along an axis and for rotary movement about said axis with respect to said support, lever means, a bearing member on said lever means, first pivot means pivotally mounting said lever means on said support substantially on said axis adjacent said arm portion, means on said arm portion for contacting said bearing member, said last-mentioned means forming second pivot means pivotally connecting said arm portion to said lever means to rotate said axial portion of said rod on rotary movement of said lever means substantially about said axis and to longitudinally move said axial portion of said rod on axial pivotal movement of said lever means in an axial direction, abutment means on said lever means operative in one position to engage said arm portion at a point spaced from said second pivot means to limit axial pivotal movement of said lever means and longitudinal movement of said rod, said abutment means being movable relative to said lever means to another position on said lever means to permit further movement of said lever means and said rod.

5. In a control linkage, a support, a rod having an axial portion and a laterally extending arm portion, means to support said axial portion of said rod on said support for reciprocal longitudinal movement along an axis and for rotary movement about said axis with respect to said support, lever means, a bearing member on said lever means, first pivot means pivotally mounting said lever means on said support substantially on said axis adjacent said arm portion, means slidably mounted on said arm portion for contacting said bearing member, resilient means for biasing said slidably mounted means into engagement with said bearing member, said slidably mounted means forming a second pivot means pivotally connecting said arm portion to said lever means to rotate said axial portion of said rod on rotary movement of said lever means substantially about said axis and to longitudinally move said axial portion of said rod on axial pivotal movement of said lever means in an axial direction, abutment means on said lever means operative in one position to engage said arm portion at a point spaced from said second pivot means to limit axial pivotal movement of said lever means and longitudinal movement of said rod, said abutment means being movable relative to said lever means to another position on said lever means to permit further movement of said lever means and said rod.

6. In a control linkage, a support, a rod having an axial portion and a laterally extending arm portion, means to support said axial portion of said rod on said support for reciprocal longitudinal movement along an axis and for rotary movement about said axis with respect to said support, lever means, a bearing member on said lever means, first pivot means pivotally mounting said lever means on said support substantially on said axis adjacent said arm portion, said first pivot means being formed by first and second bearings mounted in said support means, resilient means mounted on said rod for biasing said first and second bearings into engagement with said lever means, means slidably mounted on said arm portion for contacting said bearing member, resilient means for biasing said slidably mounted means into engagement with said bearing member in all positions of said lever means, and slidably mounted means forming a second pivot means pivotally connecting said arm portion to said lever means to rotate said axial portion of said rod on rotary movement of said lever means substantially about said axis and to longitudinally move said axial portion of said rod on axial pivotal movement of said lever means in an axial direction, abutment means on said lever means operative in one position to engage said arm portion at a point spaced from said second pivot means to limit axial pivotal movement of said lever means and longitudinal movement of said rod, said abutment means being movable relative to said lever means to another position on said lever means to permit further movement of said lever means and said rod.

References Cited by the Examiner
UNITED STATES PATENTS

| 1,516,698 | 11/24 | Belden | 74—476 |
| 1,899,332 | 2/33 | Jeffries | 74—476 |
| 2,235,975 | 3/41 | Best | 74—473 |

FOREIGN PATENTS

| 1,237,859 | 6/60 | France. |

BROUGHTON G. DURHAM, *Primary Examiner.*

UNITED STATES PATENT OFFICE
CERTIFICATE OF CORRECTION

Patent No. 3,180,175                      April 27, 1965

Geoffrey John Brook

It is hereby certified that error appears in the above numbered patent requiring correction and that the said Letters Patent should read as corrected below.

Column 1, line 46, for "mandrel" read -- manual --; column 6, line 7, for "and" read -- said --.

Signed and sealed this 21st day of September 1965.

(SEAL)
Attest:

ERNEST W. SWIDER
Attesting Officer

EDWARD J. BRENNER
Commissioner of Patents